US005766548A

United States Patent [19]

Soria

[11] Patent Number: 5,766,548
[45] Date of Patent: Jun. 16, 1998

[54] METHOD FOR MINIMIZING SOLVENT DEGRADATION AND CORROSION IN AMINE SOLVENT TREATMENT SYSTEMS

[75] Inventor: John Soria, Houston, Tex.

[73] Assignee: Cata Chem Inc., Houston, Tex.

[21] Appl. No.: 829,046

[22] Filed: Mar. 31, 1997

Related U.S. Application Data

[63] Continuation of Ser. No. 689,558, Aug. 12, 1996, abandoned, which is a continuation of Ser. No. 322,168, Oct. 13, 1994, abandoned.

[51] Int. Cl.⁶ ..................................................... C23F 11/14
[52] U.S. Cl. ........................... 422/16; 252/390; 252/393; 252/394; 252/401; 252/404; 252/405; 422/7; 422/12
[58] Field of Search ............................ 422/7, 12, 16; 252/390, 393, 394, 401, 404, 405

[56] References Cited

U.S. PATENT DOCUMENTS

| | | |
|---|---|---|
| 4,067,690 | 1/1978 | Cuisia et al. . |
| 4,278,635 | 7/1981 | Kertz . |
| 4,279,767 | 7/1981 | Muccitelli . |
| 4,289,645 | 9/1981 | Muccitelli . |
| 4,350,606 | 9/1982 | Cuisia et al. . |
| 4,487,745 | 12/1984 | Weiss et al. . |
| 4,626,411 | 12/1986 | Nemes et al. . |
| 4,728,497 | 3/1988 | Muccitelli . |
| 4,734,258 | 3/1988 | Cosper . |
| 4,810,405 | 3/1989 | Waller et al. . |
| 4,824,784 | 4/1989 | Cantarow . |
| 4,847,001 | 7/1989 | Cuisia et al. . |
| 4,859,418 | 8/1989 | Ohlendorf et al. . |
| 4,910,340 | 3/1990 | Marana et al. . |
| 4,980,128 | 12/1990 | Cuisia et al. . |
| 5,091,108 | 2/1992 | Harder et al. . |
| 5,094,814 | 3/1992 | Soderquist et al. . |
| 5,108,624 | 4/1992 | Bossler et al. . |
| 5,144,618 | 9/1992 | Gewanter et al. . |
| 5,164,110 | 11/1992 | Haraer et al. . |
| 5,167,835 | 12/1992 | Harder . |
| 5,173,213 | 12/1992 | Miller et al. . |
| 5,176,849 | 1/1993 | Hwa et al. . |
| 5,178,796 | 1/1993 | Gewanter et al. . |
| 5,256,311 | 10/1993 | Rossi et al. . |
| 5,288,907 | 2/1994 | Sherwin et al. . |

*Primary Examiner*—Timothy McMahon
*Attorney, Agent, or Firm*—Browning Bushman

[57] ABSTRACT

Control of formation of heat stable amine salts and of corrosion in an amine solvent treating system is accomplished by introduction of N,N-diethylhydroxylamine catalyzed with hydroquinone into the system. The catalyzed N,N-diethylhydroxylamine is effective at the temperature ranges of amine treating systems to effectively reduce formation of heat stable amine salts and to inhibit corrosion. The catalyzed N,N-diethylhydroxylamine is effective in proportions including the range of about 0.5 to about 6 parts N,N-diethylhydroxylamine to 1 part hydroquinone.

4 Claims, 2 Drawing Sheets

5,766,548

METHOD FOR MINIMIZING SOLVENT DEGRADATION AND CORROSION IN AMINE SOLVENT TREATMENT SYSTEMS

This is a continuation of U.S. application Ser. No. 08/689,558, filed on Aug. 12, 1996, now abandoned, which is a continuation of U.S. application Ser. No. 08/322,168, filed on Oct. 13, 1994, now abandoned.

FIELD OF THE INVENTION

The present invention relates to amine processes for treatment of hydrocarbon gases, and in particular to a method of using N,N-diethylhydroxylamine catalyzed with hydroquinone to minimize degradation of solvents used in gas treating and to minimize corrosion of metals used in gas treating.

BACKGROUND OF THE INVENTION

Sour hydrocarbon liquids and gases are treated in amine processing plants primarily to remove hydrogen sulfide ($H_2S$) and carbon dioxide ($CO_2$). In a typical plant an amine-based solvent is used to absorb hydrogen sulfide from the gases and liquids. The amine solvent and hydrogen sulfide solution is then heated to the boiling point in the amine plant regenerator to release hydrogen sulfide. The amine solvent is thus regenerated and available to be used again for further treatment of sour gas. The hydrogen sulfide is treated in a sulfur recovery unit to recover sulfur.

Oxidation of solvents used in amine gas treating plants results in the formation of organic acids and carbonyls, such as formates, acetates, formaldehydes, and acetaldehydes. Such oxidation products are commonly referred to as heat stable salts or heat stable amine salts. Heat stable amine salts are not thermally regenerated. Such salts accumulate within the system. The occurrence of such salts is associated with relatively high incidence of corrosion.

Oxygen enters amine gas treating plant systems in the sour gas feed streams, in solvent as a result of inefficient nitrogen blanketing of solvent storage tanks, or through condensate used to maintain solvent concentration. While the amount of oxygen in the system may be controlled, it cannot effectively be eliminated.

The higher the concentration of heat stable amine salts in the solvent solution, the lower the concentration of amine solvent available for treatment of sour gases and liquids. Higher concentrations of heat stable amine salts reduce operating efficiency and capacity of the amine treating system.

As currently practiced, operators of amine gas treating plants reduce concentration of heat stable amine salts by purging or reclaiming solvent.

Oxygen scavengers have long been used in boiler water systems to inhibit corrosion. Boiler water systems often involve temperatures in a range of 300° Fahrenheit to greater than 600° Fahrenheit. Recognizing the effective use of oxygen scavengers in boiler water systems, various oxygen scavengers have been practiced in amine gas treating plants to inhibit corrosion. Such oxygen scavengers include hydrazine, hydroxylamines (including N,N-diethylhydroxylamine), carbohydrazide, hydrazide, and erythorbic acid. The use of such corrosion inhibitors has resulted in only marginal improvement, if any, in corrosion inhibition.

A primary reason for such marginal improvement is that oxygen scavengers generally react relatively slowly with oxygen at low temperatures. Amine gas treating plants typically operate at maximum temperatures below 300° F. with the bulk of the system below 200° F., which temperatures are relatively low in relation to boiler systems.

Various patents disclose the use of hydroxylamine as an oxygen scavenger in high temperature, high pressure aqueous systems. Cuisia et al. U.S. Pat. No. 4,067,690 teaches the use of hydroxylamine, certain derivatives thereof and their salts as oxygen scavengers in boiler water. The Cuisia invention is intended for applications to boiler water at elevated temperature and pressure ranges, including a temperature range of 298 degrees to 637 degrees Fahrenheit.

Rossi et al. U.S. Pat. No. 5,256,311 teaches the use of hydroxylakylhydroxylamine as an oxygen scavenger in high temperature, high pressure aqueous mediums.

Kerst U.S. Pat. No. 4,278,635 discloses use of dihydroxy, diamino and amino hydroxy benzenes and their lower alkyl substituted derivatives, including hydroquinone as deoxygenating corrosion control agents. Kerst teaches that reaction rate increases with higher pH and higher temperatures, and teaches use in a boiler water system.

Muccitelli U.S. Pat. Nos. 4,279,767 and 4,289,645 disclose the use of hydroquinone as an oxygen scavenger in combination with certain neutralizing amines to neutralize carbon dioxide in a boiler condensate system. The systems preferably have elevated temperatures or alkaline conditions or both.

Nemes et al. U.S. Pat. No. 4,626,411 teaches the use of a composition containing a hydroxylamine compound, a quinone, a dihydroxybenzene, a diaminobenzene, or an aminohydroxybenzene compound together with a neutralizing amine as an oxygen scavenger in a boiler system.

As indicated, the prior art recognizes the use of various compounds, including N,N-diethylhydroxylamine and hydroquinone, for deoxygenation of aqueous solutions at elevated temperatures and pressures. The prior art generally recognizes that chemical deoxygenation is less effective at reduced temperatures. See, for example, the disclosure of Bossler et al. U.S. Pat. No. 5,108,624.

The prior art does not teach nor disclose an effective method for reducing formation of heat stable amine salts or reducing corrosion in amine solvent processing systems utilizing N,N-diethylhydroxylamine or utilizing N,N-diethylhydroxylamine with a catalyst.

It is an object of the present invention to provide an improved process for reducing the formulation of heat stable amine salts in amine solvent treating systems.

It is a further object of the present invention to provide an improved process for reducing corrosion in amine solvent treating systems.

SUMMARY OF THE INVENTION

The foregoing and other objects of the present invention are accomplished by introduction of N,N-diethylhydroxylamine catalyzed with hydroquinone into an amine solvent treating system. The catalyzed N,N-diethylhydroxylamine is effective at the temperature ranges of amine treating systems to effectively reduce formation of heat stable amine salts and to inhibit corrosion. The catalyzed N,N-diethylhydroxylamine is effective in proportions including the range of about 0.5 to about 6 parts N,N-diethylhydroxylamine to 1 part hydroquinone.

DETAILED DESCRIPTION OF THE PREFERRED EMBODIMENT

Figure 1:
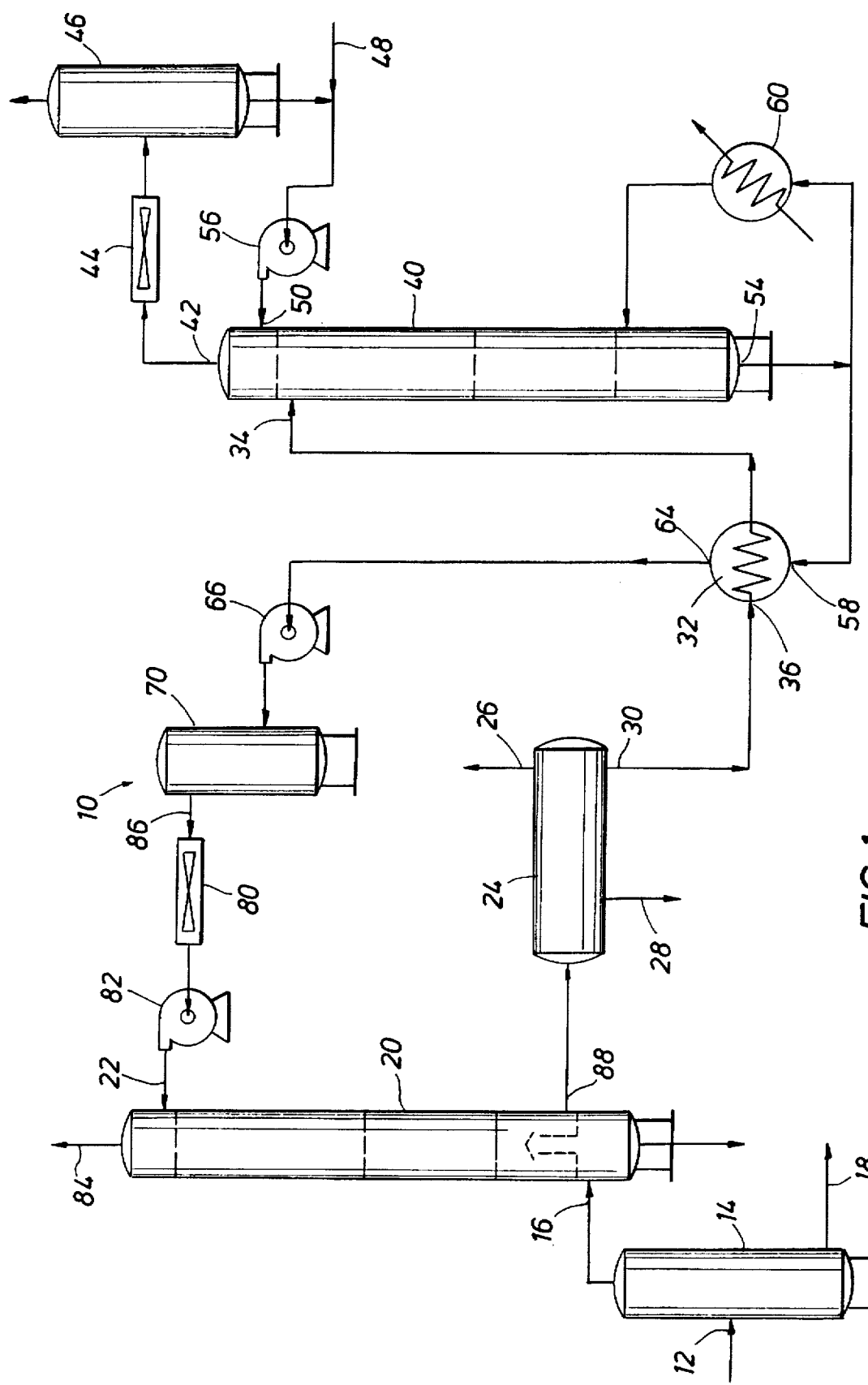
FIG. 1 depicts a flow sheet for an amine treating process.

Referring first to FIG. 1, a typical flow sheet for an amine gas treating system 10 is disclosed. In the treating system 10 of FIG. 1, sour gas enters the system at inlet 12 to separator 14. Gases are separated from liquids in the separator 14. The sour gases, which contain $H_2S$ and $CO_2$, are piped to absorber inlet 16. The liquids are transmitted out of the separator 14 at outlet 18.

In absorber 20 the sour gases are in fluid communication with an amine solvent such as diethanolamine (DEA) or methyldiethanolamine (MDEA). The absorber 20 is a column with a circulating liquid amine solvent introduced at upper inlet 22. Fluid communication is obtained as the amine solvent trickles down trays (not shown) in the absorber 20 and the sour gas migrates upwardly among the trays from inlet 16.

Processed hydrocarbon gases, after interaction with the circulating amine solvent, are transmitted from the absorber 20 through upper outlet 84.

Circulating amine solvent, containing absorbed $H_2S$ and $CO_2$, is collected at the bottom of the absorber 20 and transmitted through absorber outlet 88 to a flash tank 24. In flash tank 24 the amine solvent is subjected to decreased pressure. Hydrocarbon gases are transmitted from outlet 26 of flash tank 24 and hydrocarbon liquids are collected and transmitted from outlet 28. The circulating amine solvent is transmitted through outlet 30 to inlet 36 of heat exchanger 32. The circulating amine solvent is heated in heat exchanger 32 and transmitted to inlet 34 of regenerator 40. In regenerator 40 gases including $H_2S$ and $CO_2$ are boiled off and transmitted through outlet 42 for subsequent treatment. A reflux condenser 44 and a reflux accumulator 46 condense and accumulate for recirculation through regenerator 40 a condensate of the boiled off gases. Makeup water is introduced into the system at inlet 48.

The makeup water and the condensate from accumulator 46 are pumped to regenerator inlet 50 by pump 56.

A portion of the liquid amine solvent is circulated from regenerator outlet 54 through reboiler 60. The amine solvent is heated in reboiler 60 to its boiling point. A second portion of the liquid amine solvent is collected from the regenerator 40 and transmitted to inlet 58 of heat exchanger 32.

Circulating amine solvent is transmitted from outlet 64 of heat exchanger 32 by means of pump 66 to filter 70. A portion of the amine solvent is filtered at filter 70. The amine solvent is then further cooled at amine cooler 80 and pumped by pump 82 to absorber upper inlet 22.

Still referring to FIG. 1, the typical temperatures of the amine solvent are 120° F. to 170° F. in the absorber 20, 120° F. to 150° F. intermediate the flash tank 24 and the heat exchanger 32, 170° F. to 200° F. intermediate the heat exchanger 32 and the regenerator 40, 200° F. to 250° F. within the regenerator 40, 250° F. to 280° F. in the reboiler 60, 240° F. to 250° F. intermediate the regenerator 40 and the heat exchanger 32, 170° F. to 190° F. intermediate the heat exchanger 32 and the filter 70, and 110° F. to 130° F. intermediate the cooler 80 and the absorber 20.

The amine solvent is therefore generally in a temperature range of 110° F. to 280° F. The temperature of the amine solvent is typically 110° F. to 170° F. during periods that it is in fluid contact with the sour gas in the absorber 20.

It has been found that the introduction of N,N-diethylhydroxylamine catalyzed with hydroquinone into the amine treating system of FIG. 1 in appropriate relative concentrations of N,N-diethylhydroxylamine and hydroquinone and at appropriate concentrations of the catalyzed N,N-diethylhydroxylamine in relation to amine solvent results in improvements within the amine solvent gas treating system.

ILLUSTRATIVE EXAMPLE

N,N-diethylhydroxylamine catalyzed with hydroquinone was introduced into an operating amine solvent gas plant at a refinery in the United States. N,N-diethylhydroxylamine has a typical formula of $(C_2H_5)_2NOH$ and will be referred to in this example as DEHA. Hydroquinone is a 1,4-dihydroxybenzene compound. The amine gas plant utilized primarily methyl-diethanolamine, commonly referred to as MDEA, as the circulating amine solvent for the absorption of $H_2S$ and $CO_2$.

The formation of heat stable amine salts was observed during operation of the amine gas plant prior to the introduction of the catalyzed DEHA, during operation while utilizing the catalyzed DEHA and during operation while utilizing DEHA without a catalyst.

Figure 2:
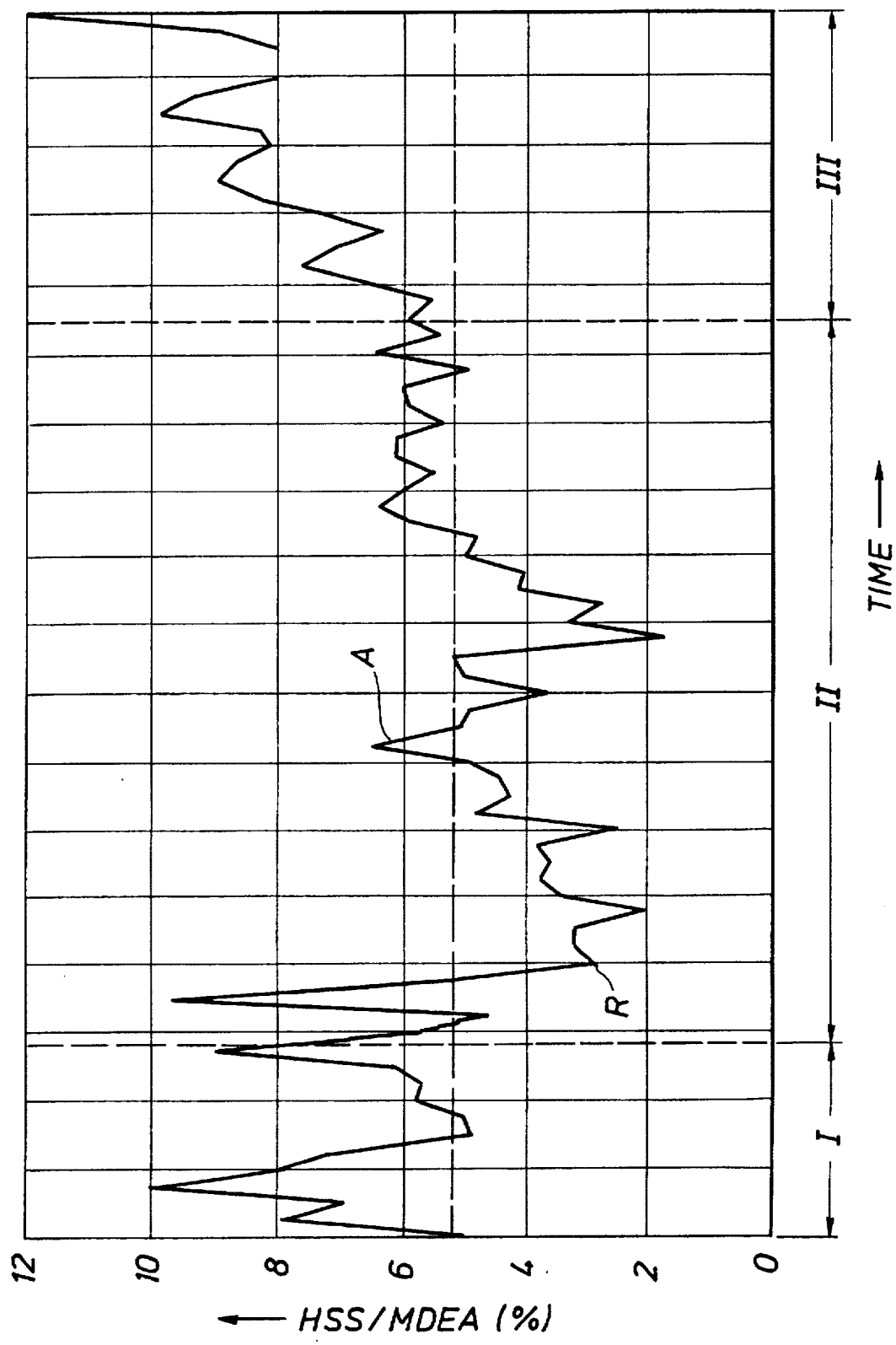
FIG. 2 depicts relative concentrations of heat stable salts in circulating amine solvent of an amine treating process over time.

Referring to FIG. 2, certain results of the test are shown by means of a graph. The results depicted in FIG. 2 are the relative amounts by weight of heat stable amine salts present in samples of circulating solvent. The test was conducted over a period of approximately 13 months in three phases, identified on FIG. 2 as phases I, II, and III. The first test condition, phase I, comprised a period when no corrosion inhibitors were introduced into the system. During phase II, DEHA catalyzed with hydroquinone was introduced into the system. During phase III, DEHA was introduced into the system without a catalyst.

The percentage of heat stable amine salts present in samples of circulating amine solvent during the test phases is indicated in FIG. 2 by the line A.

Referring to FIG. 2, during phase I the circulating amine solvent contained heat stable amine salts at levels of 5% to 10% by weight. The substantial decline of line A during phase I occurred as a result of reclamation of amine solvent by an ion-exchange process. Absent such reclamation, the percentage of heat stable amine salts would have been higher.

During phase I the observed amount of heat stable amine salts within the amine solvent increased at a rate of 2.4% per month.

During phase II DEHA catalyzed with hydroquinone was introduced into the circulating amine solvent at inlet 36 of the heat exchanger 32. The catalyzed DEHA was additionally introduced into the circulating amine solvent at the inlet 86 of the amine cooler 80. At both injection locations, the catalyzed DEHA was introduced into the process stream utilizing a stainless steel injection quill. Such quills are commonly used in the industry. The injection quill is utilized to inject the catalyzed DEHA near the middle of the solvent stream to enhance mixing.

The quantity of catalyzed DEHA mixed with the circulating solvent was adjusted from time to time. Samples were taken of circulating amine solvent at the outlet 88 of the absorber 20 and at the outlet 54 of the regenerator 40. The amount of total iron (including soluble and insoluble iron compounds) in each sample was determined. If the total iron exceeded 1 part per million at outlet 88 of absorber 20, the amount of catalyzed DEHA introduced into the system at cooler inlet 86 was increased until total iron levels in subsequent samples were below 1 part per million. If the total iron exceeded 1 part per million at outlet 54 of regenerator 40, the amount of catalyzed DEHA introduced into the circulating amine solvent at heat exchanger inlet 36 was increased until total iron level in a subsequent sample was below 1 part per million. The presence and quantity of iron compounds in the solvent samples is an indicator of corrosion within the system. Corrosion control was indicated by maintenance of the total iron at the level of 1 part per million of amine solvent.

Still referring to FIG. 2, the observed level of heat stable amine salts in the circulating amine solvent during phase II indicates an initial decrease of heat stable salts, a subsequent short-duration increase, and a subsequent sharp decline. Such initial fluctuation resulted from adjustments of catalyzed DEHA quantities and from reclamation of solvent by an ion-exchange process. After the reclamation indicated by point R on line A, there was no further reclamation of solvent during phase II. During phase II after the reclamation indicated at point R, the level of heat stable amine salts in the circulating solvent generally remained at or below 6% by weight of the amine solvent.

During phase II the observed amount of heat stable amine salts within the amine solvent increased at a rate of 0.3% per month.

During phase II the relative concentrations of DEHA and hydroquinone were varied from time to time. Ranges of 1 part to 5 parts of DEHA to 1 part hydroquinone were effective in maintaining the levels of heat stable amine salts indicated by line A in FIG. 2. Although some variation of the effectiveness of the catalyzed DEHA was noted, the catalyzed DEHA was effective at all such levels to accomplish significant reductions in heat stable salts and in maintaining total iron in the circulating amine solvent at the desired level.

The range of 2 to 4 parts DEHA to one part hydroquinone is optimal. At margin ranges of 0.5 to 1 part DEHA to 1 part hydroquinone and of 5 to 6 parts DEHA to 1 part hydroquinone the method may be practiced, but less effectively than the effective range indicated.

Effective doses of catalyzed DEHA to amine solvent are determined by the amount of dissolved oxygen entering the amine solvent system. The optimum level of catalyzed DEHA to dissolved oxygen is the range of 2 to 4 parts per million DEHA to 1 part per million oxygen. However, effective results are obtained within a range of 0.5 part per million to 5 parts per million DEHA to 1 part per million oxygen.

Still referring to FIG. 2, the level of heat stable salts in the circulating amine solvent increased during phase III with the use of DEHA without a catalyst. The level of heat stable amine salts is generally coincident with the level of heat stable amine salts during phase I when a corrosion inhibitor was not used.

During phase III the observed amount of heat stable amine salts within the amine solvent increased at a rate of 2.2% per month.

As illustrated, the introduction of DEHA catalyzed with hydroquinone in accordance with the method described results in substantial reduction of formation of heat stable amine salts in circulating amine solvent and maintains the level of total iron in solvent samples at 1 part per million or less.

While the foregoing disclosure is oriented to an amine solvent gas plant, the said disclosure is appropriate for use in treating of hydrocarbon liquids containing $H_2S$.

While this invention has been described with reference to particular embodiments thereof, it is apparent that numerous other forms and modifications of this invention will be obvious to those skilled in the art. This invention should be construed to include such modifications as are within the scope of the present invention and the appended claims.

I claim:

1. A method for reducing corrosion in an amine solvent scrubbing system, comprising:

adding to the amine solvent of said amine solvent treating system N,N-diethylhydroxylamine and hydroquinone in a weight ratio of 0.3 to 6 parts N,N-diethylhydroxylamine to 1 part hydroquinone whereby the formation of heat stable amine salts is reduced; and monitoring the iron content of said amine solvent and adding N,N-diethylhydroxylamine and hydroquinone whenever said iron content is above a predetermined level.

2. The method of claim 1, wherein the ratio of the combined amounts of N,N-diethylhydroxylamine and hydroquinone to oxygen entering said amine solvent system is between about 0.5 to about 5 ppm to 1 ppm.

3. A method for reducing corrosion in an amine solvent treating system, comprising:

adding to the amine solvent of said amine solvent treating system a heat stable amine salt inhibitor composition consisting essentially of N,N-diethylhydroxylamine and hydroquinone in a weight ratio of 0.5 to 6 parts N,N-diethylhydroxylamine to 1 part hydroquinone whereby the formation of heat stable amine salts is reduced; and monitoring the iron content of said amine solvent and adding N,N-diethylhydroxylamine and hydroquinone whenever said iron content is above a predetermined level.

4. The method of claim 3, wherein said inhibitor composition is added in an amount sufficient to provide a ratio of inhibitor composition to oxygen entering said amine solvent system of from about 0.5 ppm to 5 ppm inhibitor composition to 1 ppm oxygen.

* * * * *